3,268,550
N-BUTENYL CARBAZOLES
Jorge Heller, Palo Alto, Calif., assignor, by mesne assignments, to International Business Machines Corporation, New York, N.Y., a corporation of New York
No Drawing. Filed Aug. 26, 1963, Ser. No. 304,696
2 Claims. (Cl. 260—315)

The present invention generally relates to organic compounds and more particularly relates to new substituted carbazoles, such as 9-(3-butenyl) carbazole and 9-(4-monohalogenated butyl) carbazole.

Carbazole is a well known nitrogen-containing organic compound, also known as dibenzopyrrole or diphenylenimine, having the following structural formula:

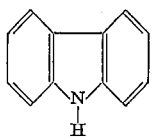

Carbazole has a melting point of about 244–246° C. and a boiling point of 352–354° C., is soluble in alcohol and ether and is insoluble in water. It is commercially used in the manufacture of carbazole-type dyes and also as a chemical reagent in various types of reactions. Thus, it has been employed in the manufacture of explosives, insecticides, fungicides, lubricants, rubber antioxidants and the like, and is employed as an odor inhibitor for detergents.

Carbazole can be obtained from crude anthracene cake by selective solution of phenanthrene with crude solvent naphtha, followed by removal of the phenanthrene by its conversion into a sulfonic derivative and then extraction by water. Carbazole has also been synthetically produced from orthoaminodiphenyl.

In view of the increasing utility of carbazole for various reactions, including a variety of syntheses and the like, it would be desirable to provide carbazole derivatives capable of yielding new chemical products with suitable chemical, physical and electrical characteristics.

Accordingly, it is the principal object of the present invention to provide new reactive carbazole derivatives.

It is a still further object of the present invention to provide new carbazole derivatives capable of chemically reacting to participate in the production of new products having selected physical and chemical characteristics.

These and other objects are accomplished in accordance with the present invention by preparing new compounds such as 9-(3-butenyl) carbazole and 9-(4-monohalogenated butyl) carbazoles.

Attempts have been made to prepare 9-(3-butenyl) carbazole by the condensation (dehydrohalogenation) of sodium carbazole with 4-bromobutene-1. However, such attempts have not been successful because of the formation of butadiene from the 4-bromobutene-1 by catalysis afforded by the sodium carbazole. Even when such reaction has been carried out over a wide range of temperatures and even when lithium carbazole has been substituted for sodium carbazole in order to favor the desired condensation reaction, rather than the dimerization reaction, 9-(3-butenyl) carbazole could not be produced in significant concentration.

However, it has now been discovered that 9-(3-butenyl) carbazole can be easily and efficiently prepared in a substantial yield by the condensation of sodium carbazole and 1,4-dichlorobutane or 1,4-dibromobutane, followed by dehydrohalogenation of the condensation product. As an example, sodium carbazole has been reacted with 1,4-dichlorobutane in a suitable reaction medium, tetrahydrofuran, at refluxing temperature to prepare a new compound, 9-(4-chlorobutyl) carbazole. The 9-(4-chlorobutyl) carbazole was then dehydrohalogenated utilizing potassium tertiary butoxide as a dehydrohalogenating agent (hydrogen halide acceptor) under refluxing conditions while the 9-(4-chlorobutyl) carbazole was disposed in a suitable reaction medium, tertiary butyl alcohol, to prepare a significant yield of the new compound 9-(3-butenyl) carbazole. It will be understood that 9-(4-chlorobutyl) carbazole and similar new 9-(4-monohalogenated butyl) carbazoles can also be prepared, which compounds are useful as intermediates in the preparation of the 9-(3-butenyl) carbazole and other substituted carbazoles, as well as other compounds.

The 9-(3-butenyl) carbazole itself has been found to be highly suitable for a number of uses. Thus, it is useful as an intermediate in the preparation of a wide range of new chemicals, including new types of polymeric materials which can be used for insulation purposes, coatings, etc., and also for the production of suitable polymeric-containing products, for example photoconductors and the like. It has also been found that 9-(3-butenyl) carbazole is also suitable for use in the production of agricultural chemicals, including insecticides, fungicides and the like, pharmaceutical preparations and other chemical products.

The 9-(3-butenyl) carbazole is highly reactive due, in part, to the presence of the double bond therein, at which site chemical reactions, both of the free radical type and of the ionic type, can take place. Moreover, polymerization can occur through the double bond and active substitution can take place on the aromatic nucleus. In addition, the nitrogen atom of the 9-(3-butenyl) carbazole can be oxidized readily. Thus, for example, 9-(3-butenyl) carbazole is capable of introducing a dye site or a plurality of dye sites in a polymer, such as polypropylene or the like. Accordingly, 9-(3-butenyl) carbazole has been found to be a new and useful chemical compound for the preparation of selected chemical products having selected physical and chemical characteristics.

In another aspect of the invention, as previously described, new halogen-substituted carbazoles are provided which are suitable for use in the preparation of the 9-(3-butenyl) carbazole and other compounds.

The foregoing and other objects, features and advantages of the present invention will be apparent from the following more particular description of preferred embodiments of the invention.

In accordance with the present invention, an alkali metal carbazole is condensed with a dihalogenated butane. The product can then be dehydrohalogenated to produce 9-(3-butenyl) carbazole. The alkali metal carbazole is preferably sodium carbazole, but can be, if desired, potassium carbazole or lithium carbazole. The alkali metal carbazole can be obtained in any suitable manner, as by reacting carbazole with a selected alkali metal hydride in the presence of a suitable solvent at ambient temperature. Such solvent can, for example, be tetrahydrofuran or the like. The reaction can be characterized as follows:

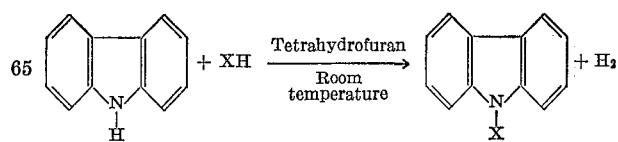

where X is selected from the group consisting of sodium, potassium and lithium.

The dihalogenated butane is commercially available and is of the 1,4-type. Thus, the butane can be 1,4-dichlorobutane, 1,4-dibromobutane, 1-chloro, 4-bromobutane, 1-bromo, 4-chlorobutane, 1,4-diiodobutane or the like. The halogens of the dihalogenated butane are selected from the group consisting of chlorine, bromine and iodine, and mixtures thereof. The halogen atoms on the butane at the 1- and 4-positions can either be of the same type or any two of the indicated three types of halogens.

Condensation of the sodium or other alkali metal carbazole with 1,4-dihalogenated butanes is carried out, preferably at refluxing temperatures or any other suitable temperature, for example 70–75° C., with the reactants dissolved in a suitable organic solvent, for example tetrahydrofuran, or the like, and in the presence of a catalyst, such as sodium iodide or the like, so as to provide the new 9-(4-halogenated butyl) carbazoles. The reaction is carried to substantial completion in, for example, a period of 16 to 18 hours. The reaction is indicated below:

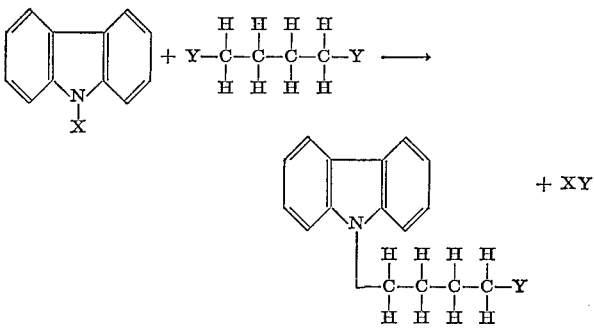

where X is selected from the group consisting of sodium, potassium and lithium and where Y is selected from the group consisting of chlorine, bromine and iodine.

As an example, the sodium of sodium carbazole reacts with one of the chlorine atoms of 1,4-dichlorobutane to condense the butane with the carbazole to form monochlorobutyl carbazole, specifically 9-(4-chlorobutyl) carbazole.

Dehydrohalogenation of the 9-(4-monohalogenated butyl) carbazole, that is, 9-(4-chlorobutyl) carbazole, or 9-(4-bromobutyl) carbazole or 9-(4-iodobutyl) carbazole, is carried out by utilizing any suitable dehydrohalogenation catalyst or hydrogen halide acceptor which results in the desired product and a satisfactory yield. However, it has been found that, for most purposes, drastic conditions are required and that metal alkoxides, such as potassium tertiary butoxide, in tertiary butyl alcohol or the like are preferred as dehydrohalogenating catalysts or hydrogen halide acceptors, for use under refluxing conditions.

The dehydrohalogenation reaction occurs over a suitable period of time, for example about 66 hours and in a suitable organic medium, for example, tertiary butyl alcohol. Other suitable media include diglyme (diethylene glycol diruethyl ether) or any other suitable high boiling solvent. During the dehydrohalogenation, the 9-(4-monohalogenated butyl) carbazole is substanatially converted to 9-(3-butenyl) carbazole by removal of the halogen atom along with a hydrogen atom from a carbon atom adjacent that carrying the halogen atom, with resultant formation of a double bond.

Upon termination of the reaction, the desired product, 9-(3-butenyl) carbazole, is separated from reactants and the solvent or organic reaction medium in any suitable manner as, for example, by evaporation of solvent and crystallization from a suitable medium, or solvent evaporation, ether extraction and crystallization, etc. As an example, the solvent can be partially evaporated, whereupon the mixture can be allowed to cool and then can be poured into water and subjected to ether extraction, the resulting ether extracts then being pooled, dried and stripped of solvent to obtain pure 9-(3-butenyl) carbazole.

The following examples further illustrate certain features of the present invention:

*Example I*

Sodium carbazole is prepared by reacting 8.3 gm. (0.050) of carbazole in 55 ml. of tetrahydrofuran, with 2.8 gm. (0.061 mol) of sodium hydride (53.1% dispersion in mineral oil) in 60 ml. of tetrahydrofuran at ambient temperature over a period of two hours. The product is then heated to refluxing temperature, transferred to a dropping funnel and added dropwise to a stirred mixture of 73.0 gm. (0.57 mol) of 1,4-dichlorobutane in 60 ml. of tetrahydrofuran and a small amount of potassium iodide, which mixture was then maintained at 70–75° C. Stirring and heating are continued for an additional 18 hours.

The cooled reaction mixture is then poured into 500 ml. of water and extracted with three 60 ml. portions of ether. The combined ether extract is then dried over anhydrous magnesium sulfate. The solvent, along with unreacted 1,4-dichlorobutane, is then removed by vacuum distillation and the solid residue recrystallized from 300 ml. of methanol to yield 8.2 gm. (63.6% yield) of a pale brown solid having a melting point of 92–95° C. Vacuum sublimation (at 130° C. and 0.1 mm. Hg) of this product gives a final white product having a melting point of 95–97° C., which is identifiable by chemical analysis as 9-(4-chlorobutyl) carbazole. The theoretical analysis for the product is the following: carbon=74.55, hydrogen=6.26, nitrogen=5.43, and chlorine=13.76. The actual chemical analysis is carbon=74.81, hydrogen=5.79, nitrogen=5.45, and chlorine=13.48, thus establishing the identity of 9-(4-chlorobutyl) carbazole.

The 9-(4-chlorobutyl) carbazole is then dehydrohalogenated. This is accomplished by mixing 1.0 gm. (0.004 mol) of the 9-(4-chlorobutyl) carbazole with 0.35 gm. (0.009 mol) of potassium and 20 ml. of tertiary butyl alcohol, the mixture then being kept at refluxing temperature for a period of 66 hours, or until substantial completion of the dehydrohalogenation reaction.

The mixture is poured in 80 ml. of water and then extracted with two 40 ml. portions of diethyl ether. The extracts are combined and dried over anhydrous magnesium sulfate. The ether is then evaporated. The heavy yellow oil which remains behind is distilled. The boiling point is 145° C. at 0.1 mm. Hg.

The product is subjected to combustion analysis, NMR (nuclear magnetic resonance) analysis and infrared spectographic analysis. The results indicate the product contains approximately 80%, by weight, of 9-(3-butenyl) carbazole (about 50% yield) and 20%, by weight, of w-tertiary butoxy-N-n-butyl carbazole having the structural formula:

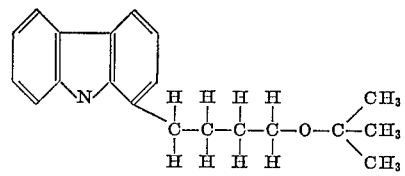

The 9-(3-butenyl) carbazole is substantially completely separated from the w-tertiary butoxy-N-n-butyl carbazole by conventional gas chromatographic separation.

*Example II*

9-(3-butenyl) carbazole is prepared by first reacting 4.1 gm. (0.025 mol) of carbazole in 30 ml. of tetrahydrofuran with sodium hydride. The sodium hydride is present in a concentration of 1.4 gm. (0.034 mol) as a 53.1% suspension in mineral oil, in 30 ml. of tetrahydrofuran. The mixture is maintained at ambient temperature over a period of two hours.

The resulting sodium carbazole is then heated to refluxing temperature, transferred to a dropping funnel and added dropwise to a stirred mixture of 54.0 gm. (0.25 mol) of 1,4-dibromobutane disposed in 25 ml. of tetrahydrofuran. The resulting mixture is maintained at refluxing temperature during the reaction which occurs over a period of about 18 hours. The reaction mixture is then cooled and poured into 500 ml. of water and extracted with three 60 ml. portions of ether. The combined ether extract is dried over anhydrous magnesium sulfate, and the solvent along with unreacted 1,4-dibromobutane are then removed by vacuum distillation. The resulting pale yellow solid is present in a concentration of 6.2 gm. (83.0%). Vacuum sublimation at a temperature of 140° C. and at a pressure of 0.2 mm. Hg yields a white product having a melting point of 104–106° C. The theoretical analysis for 9-(4-bromobutyl) carbazole is the following: carbon=63.58, hydrogen=5.34, nitrogen=4.64 and bromine=26.44. The actual chemical analysis of the product is the following: carbon=63.76, hydrogen=5.57, nitrogen=4.63 and bromine=26.32, thus establishing that the product is 9-(4-bromobutyl) carbazole.

The 9-(4-bromobutyl) carbazole is then utilized in a concentration of 1.2 gm. together with a dehydrobrominator to produce the final desired product 9-(3-butenyl) carbazole. The procedure for this step is substantially identical to that set forth in Example I. In this regard, the 1.2 gm. concentration of 9-(4-bromobutyl) carbazole is mixed with 0.35 gm. of potassium and 20 ml. of tertiary butyl alcohol. The mixture is held at refluxing temperature for a period of about 66 hours, at the end of which time the dehydrohalogenation reaction is terminated.

The recovery and purification of the desired product, 9-(3-butenyl) carbazole, are achieved in the same manner as set forth in Example I. The 9-(3-butenyl) carbazole is present in about 50% yield, along with w-tertiary butoxy-N-n-butyl carbazole (about 70%, by weight, of 9-(3-butenyl) carbazole and about 30%, by weight, of the indicated ether). Separation of the 9-(3-butenyl) carbazole from the indicated ether is carried out in the gaseous state by conventional gas chromatographic separation using helium.

Carrier gas liquid separation by liquid chromatographic separation methods can also be effected.

Successful synthesis of 9-(3-butenyl) carbazole can also be carried out utilizing substantially the same procedure as set forth in Examples I and II, but substituting other 1,4-dihalogenated butanes, for example, 1,4-diiodobutane, 1-chloro, 4-bromobutane and 1-bromo, 4-chlorobutane.

An alternative method of preparation of 9-(3-butenyl) carbazole involves the preparation of a dimethyl amine derivative from 9-(4-monohalogenated butyl) carbazole, followed by oxidation of the amine and pyrolysis of the resulting oxide to the desired 9-(3-butenyl) carbazole. This method of preparation is characterized by the absence of production of undesirable side products.

Accordingly, the preceding examples clearly illustrate that the new compound 9-(3-butenyl) carbazole can be effectively prepared by the present method. As previously indicated, the present method also includes the preparation of 9-(4-monohalogenated butyl) carbazoles. Thus, the method involves the production of substituted carbazoles having the structural formula:

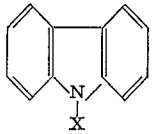

where X is a substituent selected from the group consisting of a butenyl substituent and a monohalogenated butyl substituent, specifically, a 3-butenyl substituent and a 4-monohalogenated butyl substituent where the halogen is selected from the group consisting of chlorine, bromine and iodine, preferably chlorine and bromine. These substituted carbazoles are produced, in accordance with the method, by steps which include the reaction of an alkali metal-substituted carbazole with a 1,4-dihalogenated butane under condensing-dehydrohalogenating conditions.

The 9-(4-monohalogenated butyl) carbazoles are suitable as intermediates in the preparation of 9-(3-butenyl) carbazole and other compounds while the 9-(3-butenyl) carbazole is suitable for use as an intermediate in the preparation of a wide range of new chemical compositions, including polymers, copolymers, polymeric-containing products, fungicides, pharmaceuticals and the like.

As more particularly set forth in copending application for Letters Patent, Serial No. 304,697, filed on August 26, 1963, by William A. Hewett, and entitled Polymeric Materials and Methods of Making the Same, said application having been assigned to the assignee of the present application, 9-(3-butenyl) carbazole is polymerizable through its double bond to provide polymers of various molecular weights and having monomeric unit multiplications of, for example, 70–1000. Such polymers can be homopolymers or copolymers, block copolymers, etc., in isotactic, syndiotactic or atactic form, depending upon polymerization conditions. For example, 9-(3-butenyl) carbazole can be reacted with diethyl aluminum chloride and titanium trichloride in a concentration of the carbazole to the polymerization catalyst of 20–200:1–3 at a temperature of 0–70° C. while dissolved in a suitable organic solvent, such as an aromatic of the benzene series. The reaction product, depending upon its characteristics, can be converted to fiber form, or can be used as an insulator, coating composition, binder or the like.

As an example, 9-(3-butenyl) carbazole is polymerizable to a crystalline polymer of monomer unit length of 70–1000, which polymer can be sensitized with a selected class of compounds, such as a quinone or the like, e.g., 2,5-diphenyl quinone in 3% concentration, capable of complexing with the aromatic units thereof so as to provide a crystalline product having a charge-transfer absorption band in the near ultraviolet and/or visible region of the spectrum. When such product is coated on an aluminum base plate and the resultant film is charged with a corona unit to a suitable voltage, for example about 280 volts, subsequent exposure to visible light radiation, as from a mercury arc source, results in a discharge of about one half of such voltage in about 16.7 milliseconds. Such photoconductors are suitable for use in various electrical and mechanical equipment.

Accordingly, 9-(3-butenyl) carbazole is a new and useful chemical compound, as are 9-(4-monohalogenated butyl) carbazoles, prepared by the present method. Other advantages are as set forth in the foregoing.

While the invention has been particularly shown and described with reference to preferred embodiments thereof, it will be understood by those skilled in the art that various changes in form and details may be made therein without departing from the spirit or scope of the invention.

What is claimed is the following:

1. A substituted carbazole having the formula:

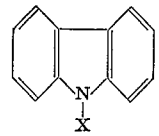

wherein X is a butenyl substituent.

2. 9-(3-butenyl) carbazole having the formula:
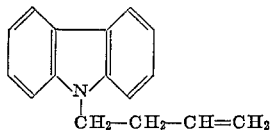
References Cited by the Examiner
FOREIGN PATENTS
811,643  4/1959  Great Britain.
OTHER REFERENCES
Clemo et al.: J. Chem. Soc., vol. 125, pp. 1804–14 (1924).
Levy: Monatsh, vol. 33, pp. 177–84 (1912).
JOHN D. RANDOLPH, *Acting Primary Examiner.*
WALTER A. MODANCE, *Examiner.*
ROBERT T. BOND, *Assistant Examiner.*